INVENTOR.
HAROLD C. MILLER
BY
ATT'Y.

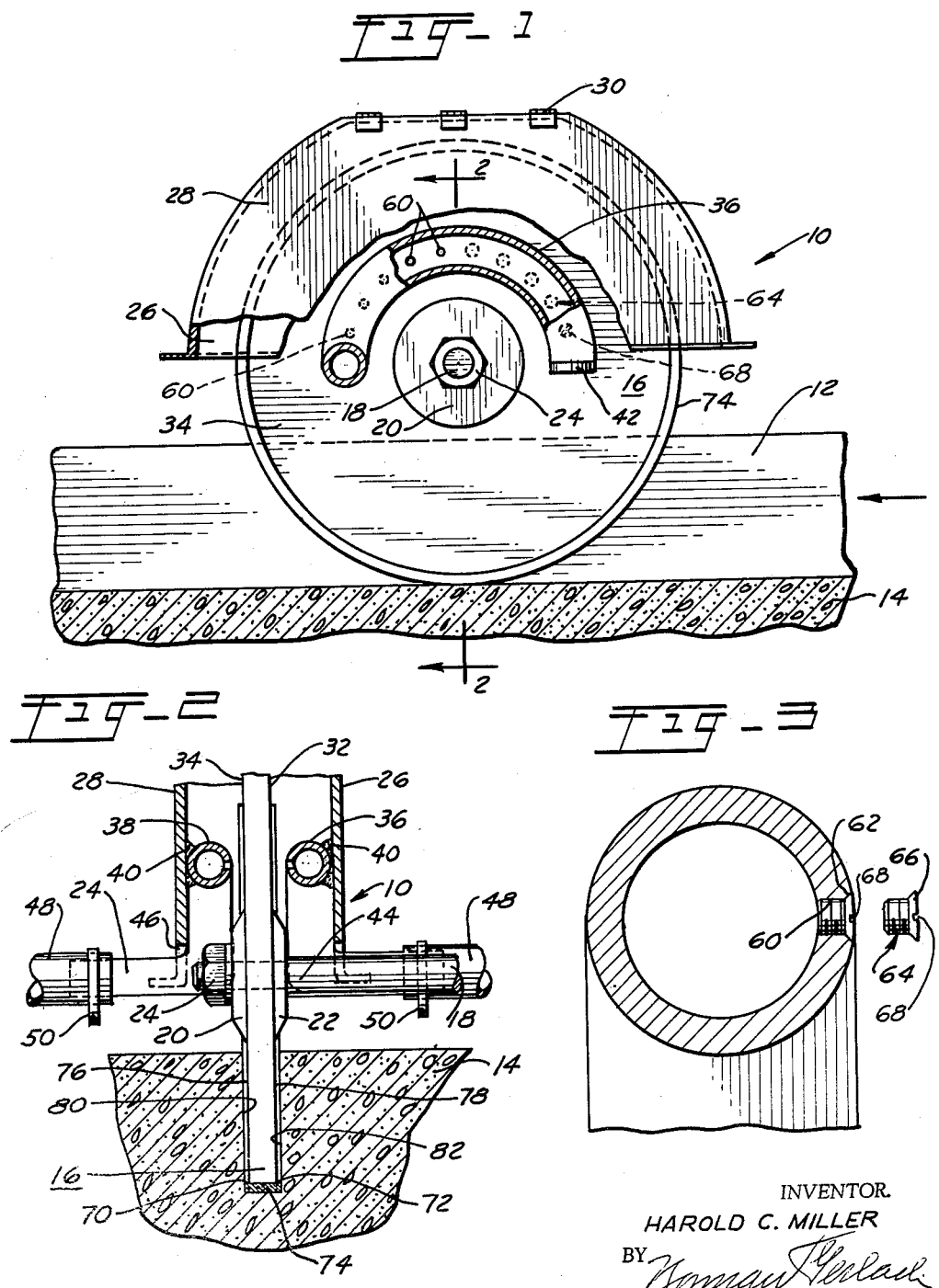

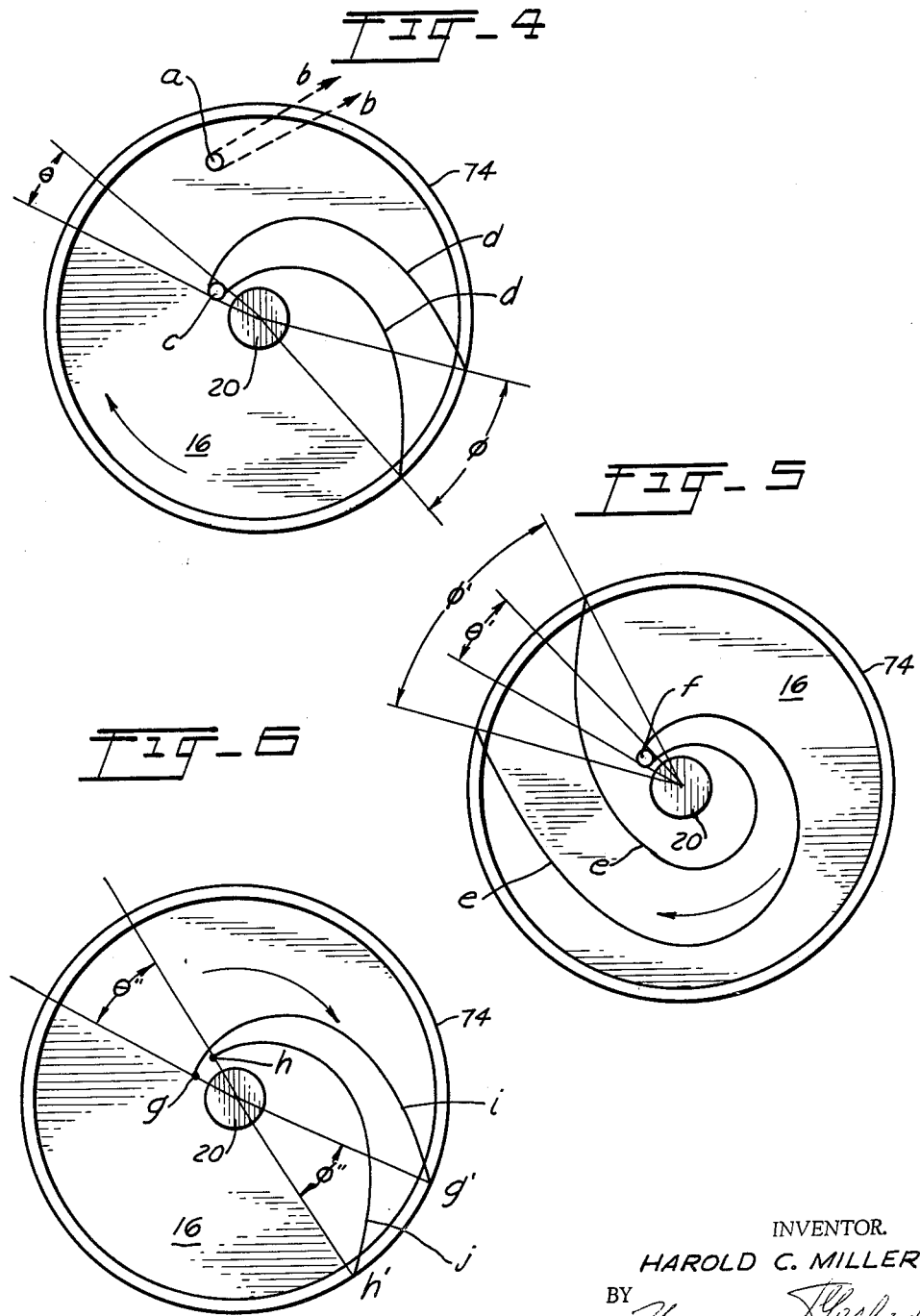

United States Patent Office 3,127,886
Patented Apr. 7, 1964

3,127,886
SYSTEM FOR SUPPLYING A COOLANT LIQUID TO A ROTARY STONE CUTTING SAW OR THE LIKE
Harold C. Miller, Chicago, Ill., assignor to Super-Cut, Inc., Chicago, Ill., a corporation of Illinois
Filed Feb. 1, 1962, Ser. No. 170,443
8 Claims. (Cl. 125—13)

The improved coolant supply system comprising the present invention has been designed for use primarily in connection with a diamond rimmed stone cutting saw of either the continuous rim or segmental rim type. Such a saw includes a flat circular metal blade on the periphery of which is mounted either a continuous circular metallic, diamond-containing or other abrasive-containing matrix, or a series of spaced apart cutting segments in the form of metallic matrices with diamond or other abrasive particles dispersed and held therein. The invention is, however, capable of other uses and the coolant supply system of the present invention may, if desired, be employed in connection with other types of stone cutting saws, masonry, or ceramic saws or, in fact, with any type of flat-sided saw where the purpose of the saw is to cut a kerf in the material or work undergoing sawing.

When using a diamond-rimmed saw, it is essential that a coolant liquid be employed, the general practice being to use water in extremely large volume or quantity. Ordinarily, fresh water is employed as a coolant inasmuch as the cost of reconditioning used water by settling-out or filtering the sludge solids and recirculating the thus cleansed water is prohibitive. The cost of fresh water will vary according to the locality in which a given operation is performed, but where the water is supplied from city mains, the cost thereof for any given operation is extremely high due to the inefficiency of present-day coolant supply systems.

The inefficiency of present-day coolant supply systems resides largely in the fact that little consideration is given to proper placement of the coolant with respect to the kerf resulting from sawing, the procedure being, usually, simply to flood the general area of the kerf with the coolant liquid and to rely upon seepage of the coolant liquid into the kerf and the sweeping action of the periphery of the saw to effect sludge removal. This flooding operation is accomplished sometimes by directing a stream of the coolant liquid into the kerf and sometimes by directing a stream or streams of the coolant liquid against one or both sides of the rotating saw blade. In either event, much of the coolant liquid is wasted in that it does not find its way into the kerf. When the coolant liquid is directed against the side or sides of the rotating saw blade indiscriminately, there is no assurance that more than a fraction of the liquid will enter the kerf. If the coolant liquid is applied to the blade of the saw in the peripheral region thereof, the high circumferential velocity of the air in this region will carry the coolant liquid generally radially and tangentially outwardly of the blade from its point of application without even wetting the blade. If the coolant liquid is applied at the hub region of the blade, the liquid will be carried outwardly on the face or faces of the blade in involute spiral fashion and thrown from the periphery of the blade at all points therearound and in varying secantial directions. Much of the collant liquid is thus flung from the periphery of the blade in directions away from the kerf but, since most stone cutting saws are provided with arcuate covers or guards, the misdirected coolant liquid is caught by the cover and caused to fall by gravity onto the surface of the material undergoing sawing and in the general vicinity of the kerf, although not actually directed into the kerf. This misdirected liquid has little value as a coolant, a lubricant, or a kerf-cleansing medium and it may, therefore, be regarded as being substantially wasted.

The present invention is designed to overcome the above-noted limitations that are attendant upon conventional present-day coolant supply systems for stone cutting saws and the like, and toward this end, it contemplates the provision of a novel coolant supply system wherein spot placement of the collant liquid against the opposite planar sides of the rotating saw blade will result in the forcible projection of substantially all of the liquid into the kerf at widely distributed regions therealong with practically no coolant liquid being flung from the periphery of the blade in directions other than in the general direction of the kerf. Because of the fact that fresh coolant liquid is caused to enter the kerf at such widely spaced regions therealong, an efficient flushing action is maintained during sawing operations and sludge build-up from the point of saw teeth entrance to the point of saw teeth emergence is effectively prevented.

The provision of a coolant liquid supply system of the character briefly outlined above being among the principal objects of the present invention, it is a further object to provide in connection with such a system means for effectively varying the points of spot placement of the coolant liquid against the sides of the rotating saw blade so taht different types of sawing operations involving changes in saw blade diameter, direction of rotation and speed of rotation may be accommodated.

Numerous other objects and advantages of the invention not at this time enumerated will become more readily apparent as the nature of the invention is better understood.

In the accompanying three sheets of drawings forming a part of this specification, one illustrative embodiment of the invention has been shown.

In these drawings:

FIG. 1 is a fragmentary side elevational view, partly in section, of a rotary stone cutting saw to which the coolant liquid supply system of the present invention has been applied and showing the saw in operation;

FIG. 2 is a vertical transverse sectional view taken on the line 2—2 of FIG. 1;

FIG. 3 is an enlarged sectional view taken transversely through the coolant liquid supply manifold employed in connection with the present invention and illustrating, in exploded fashion, the manner in which the placement of coolant liquid jets may be effectively varied;

FIG. 4 is a schematic view illustrating the phenomenon of jet divergence in connection with the application of a coolant liquid jet against one side of a rotating saw blade, and also illustrating the phenomenon of air displacement in connection with the application of another coolant liquid jet to the side of the blade;

FIG. 5 is a schematic view similar to FIG. 4 but illustrating the phenomenon of jet divergence at a different speed of saw rotation and with saw blades of varying diameters;

FIG. 6 is a schematic view similar to FIGS. 4 and 5 but illustrating the phenomenon of peripheral jet displacement in connection with the application of two coolant liquid jets to the inner regions of one side of the rotating saw blade and at spaced points thereon;

Figure 7:
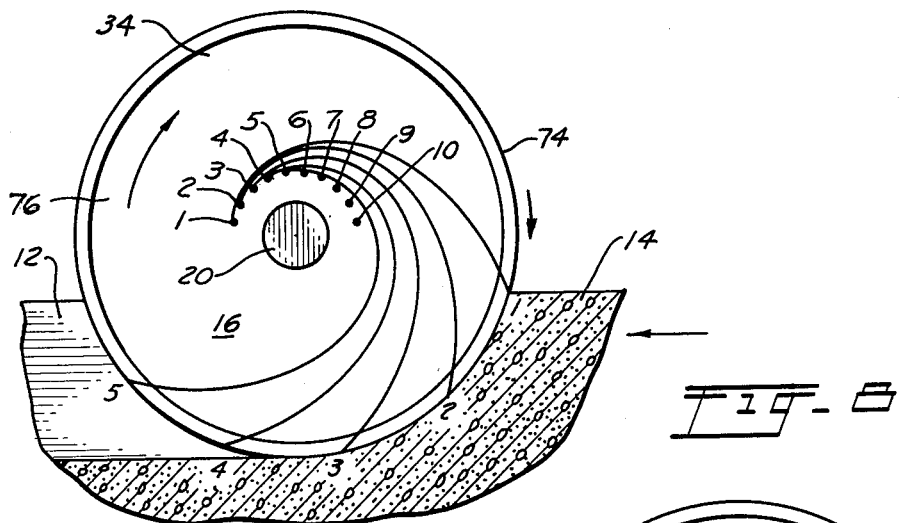
FIG. 7 is a schematic view similar to FIG. 6 but illustrating an effective coolant liquid jet placement to accommodate down-sawing operations.

Referring now to the drawings in detail, and in particular to FIGS. 1 and 2, a fragmentary portion of a typical stone cutting saw has been designated in its entirety by the reference numeral 10. The saw is shown as being in actual operation in the cutting of a kerf 12 in a piece of work, the latter being illustrated herein as being in the form of a slab 14. The saw 10 involves in its general organization a saw blade 16 which is operatively mounted on a horizontal drive shaft 18 between opposed clamping hubs 20 and 22 and is secured in position on the shaft by a clamping nut 24. The shaft 18 is adapted to be power-driven in any suitable manner as, for example, by means of a belt and pulley arrangement (not shown). The saw blade 16 has associated therewith a conventional guard including a fixed casing 26 and a movable cover 28, the latter being hinged as at 30 to the casing 26 for swinging movements between open and closed positions.

Except for the provision of the novel coolant supply system of the present invention, the saw 10 is of conventional design. The saw blade 16, the mounting therefor including the shaft 18 and the clamping hubs 20 and 22, as well as the cover-equipped guard, are the only parts which have any bearing whatsoever upon the present invention and, therefore, these parts are the only ones which have been illustrated in the drawings. It will be understood that the saw 10 may assume widely different forms and that it will be provided with suitable means for effecting relative traverse between the saw blade 16 and the work, the saw usually remaining fixed and the work being horizontally fed thereto. Other details of the saw 10, such as the work-supporting table and the specific means for rotating the shaft 16, have not been illustrated herein since regardless of the forms which they may assume, the details of the present coolant liquid supply system are not affected.

Broadly, the coolant liquid supply system of the present invention comprises a means for effecting spot placement of a series of coolant liquid jets against the opposite flat sides 32 and 34 (see FIG. 2) of the saw blade 16, together with means whereby this spot placement of jets may be varied to accommodate different types of sawing operations involving such variables as speed of rotation of the saw blade, varying saw diameters and depth of the kerf resulting from sawing. Briefly, the system comprises a pair of coolant liquid supply pipes or manifolds 36 and 38, the manifold 36 being fixedly mounted on the guard casing 26 and the manifold 38 being fixedly mounted on the guard cover 28 and movable bodily with the latter. The supply manifolds 36 and 38 may be attached to the respective guard parts in any suitable manner as, for example, by welding as indicated at 40. The two supply pipes 36 and 38 are similar in construction and, therefore, a description of one of them will suffice for the other.

The manifold 38 is generally arcuate in configuration and one end thereof is closed as at 42. The other end of the manifold is turned laterally as at 44 and projects through an opening 46 in the guard cover 28. A flexible hose connection 48 is communicatively clamped as at 50 to the laterally turned end 44 of the manifold 38 and is connected to a suitable source of coolant liquid, for example, a supply of water under pressure.

The supply manifold 38 is so disposed upon the guard cover 28 that, when the cover is in its operative or closed position upon the guard casing 26, the arcuate portion of the manifold assumes a position of close proximity to and partially encircles the hub 20, as best shown in FIG. 1 of the drawings. This arcuate portion is concentric with the shaft 18 and has a radius of curvature only slightly larger than the radius of the hub 22 so that the arcuate portion lies just outside of the hub region of the saw blade 16.

The supply manifold 38 is circular in transverse cross section and the inside wall thereof, i.e., the side thereof which directly opposes the side 34 of the saw blade 16, is provided with a series of jet-producing holes 60 therein, these holes being equally spaced along the arcuate portion of the manifold. The manifold is of 180° arcuate extent, and while a greater or lesser number of such holes 60 may be employed if desired, ten holes have been illustrated herein for exemplary purposes, this number of holes being sufficient to illustrate the principle of the invention in connection with the specific installation shown herein. The present invention resides largely in the specific placement of the holes 60 with respect to the sides of the saw blade 16 and a theoretical discussion of such placement of holes including an enumeration of the advantages accruing therefrom will presently be made in connection with FIGS. 4 to 9, inclusive.

Referring now additionally to FIG. 3, the various holes 60 are countersunk as at 62, and each hole is adapted to receive therein a threaded plug 64 which, when in position within the hole, has its outer or head portion 66 lying substantially flush with the outer cylindrical surface of the associated supply manifold 36 or 38, as the case may be. The various plugs 64 are slotted as at 68 for reception of the end of a screwdriver or similar installation tool whereby the plugs may be selectively placed within the holes. By a judicious placement of the plugs 64 in the various holes 60, the effective arcuate extent of the two supply manifolds 36 and 38, as well as the effective circumferential positioning thereof about the hub portion of the saw blade 16 may be varied for purposes that will become clear presently. It is, of course, to be understood that only certain of the holes will be plugged. Selective removal and installation of the plugs 64 in the holes 60 constitute a simple and universal means for thus varying the effective arcuate extent of the jet-producing holes 60 and for varying the placement of jets around the hub portion of the blade 16, this means serving equally well regardless of the character of the guard assembly 26, 28 which varies widely among different installations. Such means also eliminates the necessity of designing specific pin and slot or other clamping means whereby the arcuate portions of the supply manifolds may be shifted endwise and circumferentially. It is to be noted that plug insertion and removal may readily be effected on the supply manifold 38 simply by swinging the guard cover 28 to its open position where access to the supply manifold 38 may then be had. Insertion or removal of plugs in and from the supply manifold 36 may be effected by removing the saw blade 16 from its mountings on the shaft 18.

Reference will now be made to FIGS. 4 to 9, inclusive, wherein certain theoretical considerations which have given rise to the present invention have been schematically portrayed. In FIG. 4, the phenomenon of jet divergence in connection with the spot placement of a coolant liquid jet against one side of the saw blade 16 has been illustrated. Also the phenomenon of air displacement of a jet has been shown in this view. It is a matter of common knowledge that the ambient air immediately surrounding a rotating saw blade is carried along with the saw as it rotates so that, in the hub region of the saw blade, there is a region of comparative quiescence. In the peripheral regions, air swirls are generated and the air is carried generally radially outwardly of the blade and with a large component of circumferential movement. The path of air leaving the rim of the blade at any given point is generally coincident with a secant line, and the velocity of such air is relatively high and in proportion to peripheral blade speed. For these reasons, a jet of coolant liquid directed against one side of a rotating blade, such as the blade 16 under moderate jet pressure and adjacent to the periphery of the blade, will be blown away, so to speak, and observations have shown that the jet will not even wet the side of the blade. Such a jet has been shown in FIG. 4 at *a* and the direction in which it is thus airborne is indicated by the arrows *b*—*b*.

On the other hand, if a coolant liquid jet such as the jet *c* is directed against the side of the blade adjacent to the hub region thereof where the surrounding air stream is of low velocity, the jet will impinge against the blade and wet the same. Thereafter, the liquid will be thrown radially outwardly under the influence of centrifugal force, and because of its molecular tenacity, the liquid thus applied to the blade will also have a circumferential component of movement, the vectorial result being that the liquid will travel in an involute spiral path as indicated by the lines $d$—$d$. These spiral lines will be somewhat divergent. At the periphery of the blade, the coolant liquid will be flung from the blade in the form of a spray or sheet, depending upon the volume of liquid, and this sheet will have a circumferential extent indicated by the angle $\phi$ as distinguished from the smaller angle $\theta$ which represents the circumferential extent of the original coolant jet. The ratio of the angle $\theta$ to the angle $\phi$ is substantially a direct function of the diameter of the blade, as modified to some extent by speed of rotation, the higher the speed, the lower the ratio involved. FIG. 4 further illustrates the phenomenon that the sector at which the sheet of liquid is thrown from the periphery of the blade assumes a definite circumferential or angular spacing from the sector containing the initial jet $c$, this angular spacing also being dependent upon speed of rotation and blade diameter. In the illustration of FIG. 4, the sheet of coolant liquid emerging from the periphery of the blade is shown as being disposed in a sector which is 180° removed from the sector of the initial jet. The remainder of the periphery of the blade is substantially free of liquid and the total liquid of the jet is confined within the divergent spiral path represented by the lines $d$—$d$.

Referring now to FIG. 5, another example of jet divergence and liquid emergence is illustrated. If the blade 16 of this view be considered to have a lesser speed or rotation, or if the diameter thereof is considered to be appreciably greater than the diameter of the blade of FIG. 4, other things being equal, then the liquid will cling to the surface of the blade for a longer period of time and the spiral represented by the lines $e$—$e$ will be carried further around the surface of the blade in a circumferential direction so that the sheet of ejected liquid will emerge in a sector represented by the angle $\phi'$ which is wider than the angle $\phi$, the angle $\theta'$ of the sector containing the initial jet $f$ remaining the same as the angle $\theta$. Also, the placement of the sector represented by the angle $\phi'$ will be further around the surface of the blade in the direction of rotation thereof. In the illustration of FIG. 5, the diverging liquid of the jet $f$ is shown as having a 360° component of circumferential movement.

In FIG. 6, the phenomenon of circumferential jet displacement from the time of initial application of the jet to the surface of the blade to the time of jet emergence is further illustrated in connection with the placement of two jets $g$ and $h$ on the side of the blade. In this view, the phenomenon of jet divergence has been disregarded in the interests of simplicity. The two jets $g$ and $h$ are shown as being applied to the side of the blade 16 in the vicinity of the hub region thereof and at slightly circumferentially spaced regions as represented by the subtended radial angle $\theta''$. After impingement against the surface of the blade, the jet $g$ will follow the spiral path represented by the line $i$, while the jet $h$ will follow the spiral path represented by the line $j$. These spiral lines $h$ and $j$ are divergent and, disregarding the phenomenon of jet divergence, the mean points of emergence of the two streams of the coolant liquid are spaced apart on the periphery of the blade and subtend the radial angle $\phi''$. It will be noted that the circumferential spacing between the emergence points of the spiral lines $g'$ and $h'$ is appreciably greater than the circumferential spacing between the initial jets $g$ and $h$. From the above description, it will be seen that, by selective placement of an initial jet against the side of a rotating saw blade, selective emergence of the resultant spray or sheet from the periphery of the blade may be attained.

In FIG. 7, the above discussed theoretical considerations are illustrated schematically as being put in practical effect in connection with the saw installation of FIGS. 1 and 2 wherein a coolant liquid is applied to the saw blade 16 during the sawing of the kerf 12 in the slab 14. The operation illustrated in FIG. 7 is known as a down-sawing operation inasmuch as the periphery of the saw blade 16 enters the kerf 14 by a downward movement as indicated by the vertical arrow in this view, and the cutting parts of the blade perform their actual sawing operations by a downward sweep in contact with the slab 14, while the slab 14 is fed to the saw in the direction indicated by the horizontal arrow. The direction of rotation of the blade 16 is shown by the curved arrow in this view. The disclosure of FIG. 7 is intended to portray the manner in which selective placement of coolant liquid jets issuing from the various jet-producing holes 60 will result in conduction of substantially all of the coolant liquid directly into the kerf at widely spaced regions therealong and in such manner as to effect efficient flushing of the kerf while, at the same time, preventing waste of coolant liquid by confining the flow of the liquid solely to the kerf.

Before continuing with the description of the present coolant liquid supply system as applied to a down-sawing operation and, in order that the directed flow of coolant liquid into the kerf may be better understood, it is pointed out that with conventional diamond-rimmed stone cutting saws, whether they be of the continuous rim or the segmental type, the width of the kerf undergoing sawing is always somewhat wider than the thickness of the saw blade. This, in the case of a diamond or other abrasive-rimmed saw, is due to the fact that there is an appreciable amount of overhang of the continuous or of the interrupted abrasive-containing matrix on both sides of the blade body. This overhang is clearly illustrated in FIG. 2 at 70 and 72 where the matrix 74 projects laterally outwardly from the opposite sides 76 and 78 of the blade 16. This overhang of the matrix 74 results in the creation of the narrow voids 80 and 82 within the kerf 16 on opposite sides of the blade, these voids constituting clearance spaces for entry of the coolant liquid into the kerf at spaced regions therearound according to the present invention and for lubricating, cooling and flushing purposes, as will now be described in detail.

Still referring to FIG. 7 wherein a specific down-sawing operation is schematically portrayed or illustrated, the positioning of the previously-mentioned ten jet-producing holes 60 in the arcuate portion of the coolant supply manifold 38 so as to produce selectively directed coolant liquid jets against the side 76 of the saw blade 16 is represented by the ten points labelled 1 to 10, inclusive. As previously described, these jets are directed against the blade 16 just outside the hub region thereof and as close to this region as is practicable without applying the liquid to the hub flange 20. The spiralling of the coolant liquid resulting from these jets over the face of the rotating saw blade 16 in accordance with the phenomena illustrated and described in connection with FIGS. 4, 5 and 6 has been shown by the spiral lines which are correspondingly labelled. It is to be noted at this point that only jets #1 and #5, inclusive, are employed and that the holes 60 which ordinarily would produce additional jets #6 to #10, inclusive, are closed by means of plugs such as the plug 64 of FIG. 3.

Selection of jets #1 to #5, inclusive, is predicated upon a combination of factors including saw diameter and speed of saw rotation. These two factors combine to produce diverging spiral sheets of coolant liquid across the face of the blade 16 (jet divergence not being illustrated in FIG. 7). These sheets are flung from the periphery of the blade and into the kerf 12, as previously described. The liquid issuing from the #1 jet is flung from the periphery of the blade 16 in the form of a sheet of liquid, the mean position of which is represented by the #1 emergence point. This point is substantially directly at the entrance to the kerf undergoing sawing so that some of the coolant liquid sheet enters the void 80 while a portion thereof is deposited on the slab 14 just ahead of the progressing kerf, thereby wetting the same in advance of the forwardly traveling blade 16. The portion of the coolant liquid sheet which enters the kerf is carried rearwardly by the sweeping action of the diamond or abrasive-containing matrix 74 and effectively flushes the forward regions of the kerf. The #2 jet similarly spirals over the face of the blade 16 and is flung from the periphery of the blade at the #2 mean emergence point, thus wetting and flushing the kerf at a region where the matrix has cut into the kerf an appreciable distance. Similarly, the #3 jet spirals over the face of the blade 16 and is flung from the periphery of the blade at the #3 mean emergence point, this point being at a region where the matrix approaches the end of its cutting action and commences to travel out of the kerf. The #1, #2 and #3 jets are thus lubricating jets in that the liquid emanating therefrom ultimately reaches the kerf 12 at regions where the diamond or abrasive-containing matrix 24 is performing actual sawing operations upon the slab. The #4 jet is flung from the periphery of the blade at the #4 mean emergence point and this point is so disposed that the sheet of liquid is flung into the kerf from the clearance space 80 (see FIG. 2) at a region where the matrix 74 has completed its sawing operation and commences to rise through the kerf. The #4 jet thus is a flushing jet rather than a lubricating jet and serves effectively to remove the sludge which immediately trails the rotating saw blade 16. The #5 jet is flung from the periphery of the blade at the #5 mean emergence point and this point is disposed still further along the already-created kerf 12 in a trailing direction so that the sludge propelled rearwardly by the liquid of the #4 jet in the general direction of matrix travel through the kerf if further propelled along the kerf and diluted by the additional quantity of coolant liquid.

The hole 60 which ordinarily would produce a #6 jet is not employed for jet-producing purposes in connection with the down-sawing operation portrayed in FIG. 7 inasmuch as the placement of the coolant liquid from such a jet would be substantially directly at the point of emergence of the matrix from the kerf 12. No lubrication is required at this point, nor is there a need for a flushing action. The hole 60 which otherwise would produce such a #6 jet is plugged as previously described, as are the holes which otherwise would produce jets #7 to #10, inclusive.

While the illustration of FIG. 7 has been made solely in connection with the spot placement of the jets on the side 76 of the rotating saw blade 16 by means of the supply manifold 38 which is affixed to the movable hinged guard cover 28, it is to be understood that, for any given sawing operation, a similar placement of jets will be made on the other side 78 of the blade 16 by means of the supply manifold 36 which is affixed to the guard casing 26. Viewed from the opposite side 78 of the blade, the direction of rotation of the blade will appear to be counterclockwise instead of clockwise, and the direction of unfolding of the various spiral paths across the blade will be the reverse. Stated otherwise, the spiral paths of flow of the coolant liquid over the face 78 of the blade 16 will be parallel to the corresponding spiral paths of flow of the coolant liquid over the face 76 of the blade.

Figure 8:
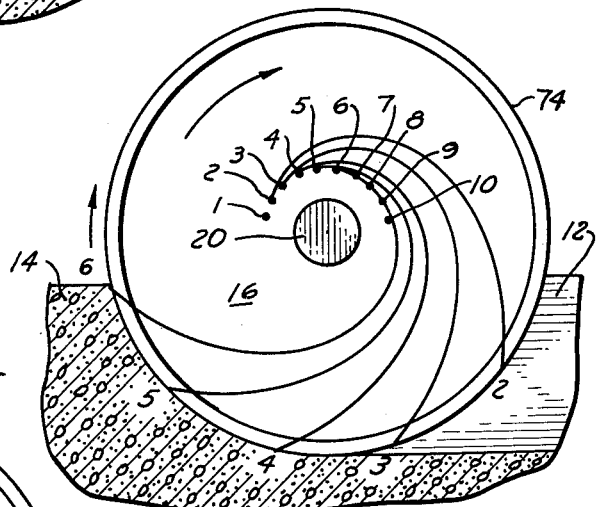
FIG. 8 is a schematic view similar to FIG. 6 but illustrating an effective coolant liquid jet placement to accommodate up-sawing operations.

The schematic representation of FIG. 8 is similar to that of FIG. 7 except for the fact that the slab 14 is fed to the rotating saw blade 16 in a direction opposite to the direction wherein it is fed in FIG. 7, the operation shown in FIG. 8 being known as up-sawing inasmuch as the actual sawing operation on the kerf 12 involves an upward sweep of the diamond or abrasive-containing matrix 74 in contact with the slab. The labeling of the jet-producing holes 60 from 1 to 10, inclusive, remains the same as in FIG. 7, while the spiral paths of liquid-flow across the face of the blade have been correspondingly labelled. It is to be presumed that the speed of rotation of the saw blade 16, the diameter of the blade, and all other factors affecting the flow of coolant liquid across the face of the blade remain the same. The direction of rotation of the blade 16 also remains the same as in FIG. 7 and is indicated by the curved arrow, but the direction of feed of the work with respect to the blade 16 is opposite as indicated by the horizontal arrow. The vertical direction of emergence of the matrix 74 from the kerf is indicated by the vertical arrow in this view.

It is to be noted that, in connection with up-sawing operations, there is no need for coolant liquid at the region where the matrix descends downwardly into the kerf 12 on the trailing side of the blade since the matrix is entering the kerf freely through the already cut kerf slot. For this reason, the hole 60 which ordinarily would produce a #1 jet is plugged. The #2 to #6 jets, inclusive, are allowed to remain effective, while the #7 to #10 jet-producing holes 60 are plugged. The liquid which is flung from the periphery of the blade 16 at the #2 and the #3 mean points of emergence, resulting from the use of the #2 and #3 jets is principally a flushing liquid since it is directed into the kerf 12 at regions which trail the cutting action of the diamond or abrasive-containing matrix 74. The #4, #5 and #6 points of emergence which result from the use of the #4, #5 and #6 jets, respectively, correspond in their function to the use of the #1, #2 and #3 jets in connection with down-sawing operations as previously described. In other words, these latter jets are essentially lubricating jets in that the liquid thereof is directed into the kerf 12 at regions where actual contact-sawing is taking place. As is the case in connection with down-sawing operations as portrayed in FIG. 7, substantially all of the liquid resulting from the various jets is directed into the kerf 12 where it performs either a lubricating or a flushing action, or both. The spot placement of jets against the side 76 of the blade 16 as portrayed in FIG. 8 is substantially duplicated on the other side 78 of the blade.

Figure 9:
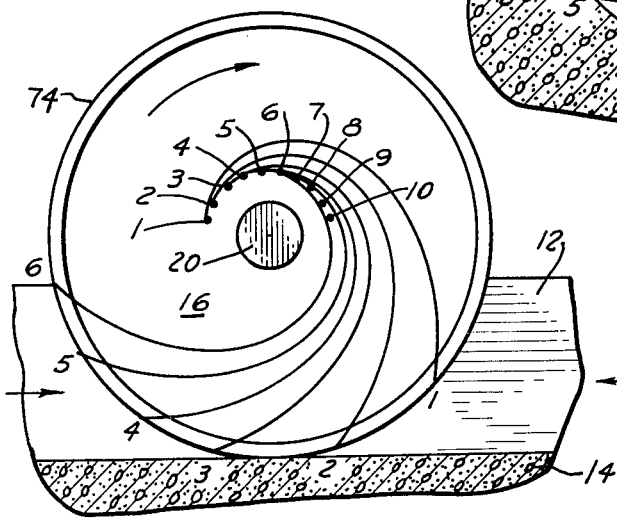
FIG. 9 is a schematic view similar to FIG. 6 but illustrating effective coolant liquid jet placement to accommodate both down-sawing and up-sawing operations.

In FIG. 9, a situation is portrayed where the coolant liquid supply system of the present invention is conditioned for both up-sawing and down-sawing operations on the same slab or other piece of work. Alternate up-sawing and down-sawing operations become effective when the slab or other work is caused to traverse the sawing region alternately in opposite directions, each successive pass of the work resulting in a change from down-sawing to up-sawing or vice versa. To accommodate this type of sawing, the holes which produce the #1 to #6 jets, inclusive, are unplugged, while the remaining holes are plugged.

The labelling of FIG. 9 corresponds to the labelling of FIGS. 7 and 8 and from this labelling, it will be seen that the direction of rotation of the saw blade 16 remains clockwise. The illustration of FIG. 9 is made upon the assumption that the speed of rotation of the blade 16 and the diameter of the blade remain the same as in FIGS. 7 and 8 and that all other considerations remain the same except for the direction of feed of the slab to the rotating saw blade. As indicated by the dual horizontal arrows, the slab is alternately fed in opposite directions past the rotating saw blade.

During down-sawing operations when the slab 14 is moving from right to left, as viewed in FIG. 9, the #1 to #5 jets, inclusive, are effective in the manner previously set forth in connection with FIG. 7 for lubrication and sludge-removal purposes. During up-sawing operations when the slab 14 is moving from left to right, the #2 to #6 jets, inclusive, are effective in the manner outlined in connection with FIG. 8. During down-sawing operations, substantially all of the liquid resulting from the use of the #1 to #5 jets is directed into the kerf, as previously described, while the liquid resulting from the #6 jet is partially effective in the kerf when it is considered that the #6 point of emergence is only a mean point and that a good portion of the liquid issuing from the divergent jet is projected into the clearance space 80 (see FIG. 2) at a region rearwardly of the region of impact of the liquid emanating from the #4 and #5 jets with the bottom of the kerf 12. The liquid resulting from the #6 jet is, therefore, not wasted.

Similarly, during up-sawing operations when the slab 14 is moving from left to right, as viewed in FIG. 9, the #2 and #6 jets are effective in the manner previously outlined in connection with FIG. 8 for lubrication and sludge-removal purposes. Substantially all of this liquid is directed into the kerf through the clearance space 80 (see FIG. 2). The #1 jet also presents a #1 region of emergence from the periphery of the blade 16 which causes the sheet of liquid to enter the kerf and augment the flushing action of the sheet issuing from the #2 region of emergence so that the liquid emanating from the #1 jet is not wasted.

Generally stated, during down-sawing operations alone, the #6 jet is not considered as essential to effective matrix-lubrication or kerf-flushing operations, while during up-sawing operations alone, the #1 jet is not considered essential. However, when alternate down-sawing and up-sawing operations are resorted to, the use of the #6 jet during down-sawing operations and of the #1 jet during up-sawing operations is not a superfluous use inasmuch as these latter jets are not altogether without useful function regardless of the direction of feed of the slab 14.

It is to be noted that where down-sawing operations alone, as exemplified by FIG. 7, or where up-sawing operations alone, as exemplified by FIG. 8, are concerned, the holes 60 which, if unplugged, otherwise would result in the provision of #7 to #10 jets, inclusive, remain plugged. These holes also remain plugged where both up-sawing and down-sawing operations are concerned, as exemplified in FIG. 9. This latter group of holes, however, is provided in order to accommodate variable factors associated with conventional stone-cutting saw operations such as changes in the rate of rotation of the saw blade 16 and changes in the diameter of the blade employed. As indicated in connection with the schematic representation of FIG. 5, the length of the involute spiral liquid paths resulting from the various jets across the face of the blade 16, and also the circumferential sweep thereof will vary with either blade diameter or blade speed. Generally speaking, a slower rate of rotation will result in a greater circumferential sweep. Similarly, a larger diameter of blade will result in a greater circumferential sweep. In an instance where the diameter of the blade is large and the rate of rotation thereof is slow, the involute spiral path of the liquid resulting from spot placement of a given jet adjacent the hub region of the blade may result in a spiral path which makes several turns in a circumferential direction as it unfolds toward the periphery of the blade. Therefore, by a judicious selection of holes 60 to produce selected jets, ranging from the #1 jet through the #10 jet, it is possible to effect various peripherally-ejected sheets of the coolant liquid directly into the kerf at the most effective spaced regions therealong for efficient lubrication or flushing action, despite wide variance in blade speed and diameter.

The invention is not to be limited to the specific herein described and illustrated arrangement of supply pipes since the character and mountings for such pipes will vary widely in accordance with differing types of stone cutting saws having different guard arrangements. It is essential only that there be employed supply pipes which are capable of effecting the desired spot placement of coolant liquid jets on the opposite sides of the rotating saw blade at a region just outside the hub region of the blade so that the resultant streams of coolant liquid falling upon the sides of the blade will be carried in involute spiral paths to certain portions of the periphery of the blade and flung therefrom into the desired kerf regions to the exclusion of the remaining peripheral portions of the blade. Therefore, only insofar as the invention has particularly been pointed out in the accompanying claims is the same to be limited.

Having thus described my invention what I claim as new and desire to secure by Letters Patent is:

1. In a rotary stone cutting saw designed for use in sawing a kerf in a workpiece, in combination, a flat-sided circular saw blade of predetermined diameter mounted for rotation about an axis and adapted to be driven at a predetermined speed, and a liquid coolant supply manifold positioned adjacent to one side of said blade and provided with a series of jet-producing holes therein, said holes being disposed in direct opposition to said one side of the blade at a region in the vicinity of the axis of rotation of the blade but spaced slightly and radially outwardly from said axis, the positioning of said holes with respect to said side of the blade being so cooperatively related to the diameter of the blade and its speed of rotation that jets of the liquid coolant issuing from said holes will impinge against said side of the blade and, under the combined influence of molecular adhesion between the liquid coolant and the blade as modified by the frictional drag of the swirling ambient air stream in the vicinity of the blade, will be given a circumferential component of motion causing the same to travel in a spiral divergent path terminating within the kerf undergoing sawing so that flat sheets of the liquid coolant are flung from a limited region of the periphery of the blade and into the kerf at spaced regions therealong, to the exclusion of the peripheral regions of the blade remote from the kerf.

2. In a rotary stone cutting saw, the combination set forth in claim 1 and wherein said holes are arranged in an arcuate row concentric with the axis of rotation of the saw.

3. In a rotary stone cutting saw, the combination set forth in claim 1 and including, additionally, a series of plugs selectively and removably receivable in said holes for rendering the same ineffective to thereby vary the placement of said flat sheets of the liquid coolant within the kerf in the event of a change in the diameter of the saw or the speed of rotation.

4. In a rotary stone cutting saw, the combination set forth in claim 1 and wherein said holes are arranged in an arcuate row concentric with the axis of the rotation of the saw, and including, additionally, a series of plugs selectively and removably receivable in said holes for rendering the same ineffective to thereby vary the placement of said flat sheets of the liquid coolant within the kerf in connection with a change in the diameter of the saw or the speed of rotation.

5. In a stone cutting saw designed for use in sawing a kerf in a workpiece, a flat-sided circular saw blade provided with an abrasive rim which overhangs the opposite sides of the blade, a drive shaft for said blade, hub flanges on opposite sides of the blade clamping the blade to said drive shaft, a blade guard including guard sides straddling the blade and opposing the opposite side surfaces of the blade, a coolant supply manifold interposed between one of said guard sides and the adjacent side surface of the blade, said manifold being formed with an arcuate row of jet-producing holes therein opposing said one side surface and in close proximity to the adjacent hub flange, means for varying the effective arcuate extent of said row of holes, and means for supplying a coolant liquid to said manifold.

6. In a stone cutting saw designed for use in sawing a kerf in a workpiece, a flat-sided circular saw blade provided with an abrasive rim which overhangs the opposite sides of the blade, a drive shaft for said blade, hub flanges on opposite sides of the blade clamping the blade to said drive shaft, a blade guard including guard sides straddling the blade and opposing the opposite side surfaces of the blade, a coolant supply manifold interposed between one of said guard sides and the adjacent side surface of the blade, said manifold being formed with an arcuate row of jet-producing holes therein opposing said one side surface and in close proximity to the adjacent hub flange, a series of plugs selectively receivable in said holes for rendering the same ineffective to thereby vary the effective arcuate extent of said row of holes, and means for supplying a coolant liquid to said manifold.

7. In a stone cutting saw designed for use in sawing a kerf in a workpiece, a flat-sided circular saw blade provided with an abrasive rim which overhangs the opposite sides of the blade, a drive shaft for said blade, hub flanges on opposite sides of the blade clamping the blade to said drive shaft, a blade guard including guard sides straddling the blade and opposing the opposite side surfaces of the blade, a coolant supply manifold interposed between one of said guard sides and the adjacent side surface of the blade, said manifold being formed with an arcuate row of jet-producing holes therein opposing said one side surface, in close proximity to the adjacent hub flange, and disposed entirely above the level of the hub flange, means for varying the effective arcuate extent of said row of holes, and means for supplying a coolant liquid to said manifold.

8. In a stone cutting saw designed for use in sawing a kerf in a workpiece, a flat-sided circular saw blade provided with an abrasive rim which overhangs the opposite sides of the blade, a drive shaft for said blade, hub flanges on opposite sides of the blade clamping the blade to said drive shaft, a blade guard including guard sides straddling the blade and opposing the opposite side surfaces of the blade, a coolant supply manifold interposed between one of said guard sides and the adjacent side surface of the blade, said manifold being formed with an arcuate row of jet-producing holes therein opposing said one side surface, in close proximity to the adjacent hub flange, and disposed entirely above the level of the hub flange, a series of plugs selectively receivable in said holes for rendering the same ineffective to thereby vary the effective arcuate extent of said row of holes, and means for supplying a coolant liquid to said manifold.

References Cited in the file of this patent

UNITED STATES PATENTS

| | | |
|---|---|---|
| 366,897 | Stiles | July 19, 1887 |
| 2,163,687 | Jacobsen | July 27, 1939 |
| 2,462,710 | Ballinger | Feb. 22, 1949 |
| 2,842,908 | Allison | July 15, 1958 |
| 2,857,147 | Lewis | Oct. 21, 1958 |
| 2,899,781 | Williams | Aug. 18, 1960 |
| 2,991,599 | Else | July 11, 1961 |

FOREIGN PATENTS

| | | |
|---|---|---|
| 1,239,700 | France | July 18, 1960 |